United States Patent
Kawaguchi

(10) Patent No.: US 12,260,090 B2
(45) Date of Patent: Mar. 25, 2025

(54) STORAGE NETWORK RESOURCE MANAGEMENT

(71) Applicant: Hitachi, Ltd., Tokyo (JP)

(72) Inventor: Tomohiro Kawaguchi, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 3 days.

(21) Appl. No.: 18/104,145

(22) Filed: Jan. 31, 2023

(65) Prior Publication Data

US 2024/0256137 A1    Aug. 1, 2024

(51) Int. Cl.
   *G06F 3/06*      (2006.01)
(52) U.S. Cl.
   CPC ........... *G06F 3/0613* (2013.01); *G06F 3/065* (2013.01); *G06F 3/067* (2013.01)
(58) Field of Classification Search
   CPC ......... G06F 3/0613; G06F 3/065; G06F 3/067
   USPC .................................................. 711/154, 161
   See application file for complete search history.

(56) References Cited

U.S. PATENT DOCUMENTS

| | | | |
|---|---|---|---|
| 8,347,053 B2 | 1/2013 | Arakawa et al. | |
| 2015/0236926 A1* | 8/2015 | Wright | G06F 3/061 709/224 |
| 2021/0124492 A1* | 4/2021 | Savir | G06F 3/0631 |
| 2021/0255795 A1* | 8/2021 | Lin | G06F 3/0653 |
| 2022/0091790 A1 | 3/2022 | Sato et al. | |
| 2022/0239879 A1* | 7/2022 | Ito | H04N 23/741 |
| 2022/0342762 A1* | 10/2022 | Bora | G06F 3/0619 |
| 2023/0026185 A1* | 1/2023 | O'Riordan | G06F 3/0665 |

* cited by examiner

*Primary Examiner* — Than Nguyen
(74) *Attorney, Agent, or Firm* — Procopio, Cory, Hargreaves & Savitch LLP

(57) ABSTRACT

Systems and methods described herein can involve, responsive to a request of a volume requiring remote copy, checking an IO throughput setting of the volume; using network bandwidth based on the IO throughput setting of the volume; and for the use of the network bandwidth not exceeding total remote copy network resources allocated for existing volumes configured with remote copy and the volume requiring remote copy, establishing a remote copy relationship for the volume in response to the request.

9 Claims, 11 Drawing Sheets

Service Catalogue Definition

Service Catalogue 200-2

| Service Name 200-2-1 | Unit Price [USD/day] 200-2-2 | Remote Copy 200-2-3 | Unit Capacity [GB] 200-2-4 | Unit Max Write Throughput [MB/s] 200-2-5 | Unit Min Throughput Goal [MB/s] 200-2-6 | Unit Max Read Throughput [MB/s] 200-2-7 | Unit Goal Min Throughput Goal [MB/s] 200-2-8 |
|---|---|---|---|---|---|---|---|
| Bronze | 0.1 | No | 100 | 10 | 0 | 10 | 0 |
| Silver | 0.3 | No | 100 | 50 | 0 | 50 | 0 |
| Gold | 0.1 | No | 100 | 50 | 20 | 50 | 40 |
| Bronze DR | 0.5 | Yes | 100 | 10 | 0 | 10 | 0 |
| Silver DR | 1.5 | Yes | 100 | 50 | 0 | 50 | 0 |
| Gold DR | 5.0 | Yes | 100 | 50 | 20 | 50 | 40 |

[ Cancel ]  [ Apply ]

FIG. 3

Volume Database 200-3

| Volume Name 200-3-1 | Type 200-3-2 | Units 200-3-3 | Sites 200-3-4 | Storage Device 200-3-5 |
|---|---|---|---|---|
| Test-0 | Bronze | 1 | 1a | 100a |
| Test-1 | Bronze | 1 | 1a | 100b |
| Test-2 | Silver | 1 | 1b | 100c |
| Test-3 | Silver DR | 1 | 1a, 1b | 100a, 100c |
| Prod-0 | Gold | 8 | 1a | 100b |
| Prod-1 | Gold DR | 8 | 1a, 1b | 100a, 100c |

Storage Resource Database 200-4

| Storage Device 200-4-1 | Capacity [TB] 200-4-2 | Max Read Throughput [MB/s] 200-4-3 | Max Read Throughput [MB/s] 200-4-4 |
|---|---|---|---|
| 100a | 2000 | 500 | 1000 |
| 100b | 1000 | 300 | 600 |
| 100c | 2000 | 500 | 1000 |
| 100d | 1000 | 300 | 600 |

Network Resource Database 200-5

| Sites 200-5-1 | Bandwidth [GB/s] 200-5-2 | Warning Threshold [GB/s] 200-5-3 |
|---|---|---|
| 1a, 1b | 1000 | 950 |

FIG. 5

$$W_{n+1} \leq B - \sum_{i=1}^{n} \sigma_i W_i \quad \text{F100}$$

B: Network bandwidth
n: Number of existing volumes
$W_i$: Max throughput limit set for the volume specified by identifier i
$\sigma_i$: 1 if volume i uses remote copy, 0 otherwise

FIG. 7

$$W_{n+1} \leq B - \sum_{i=1}^{n} \sigma_i W_i \quad \text{F200}$$

$$\sum_{i=1}^{n+1} \rho_i \sigma_i W_i \leq B \quad \text{F201}$$

$$W_i \leq \rho_i W_i, \ 0 \leq \rho_i \leq 1$$

$B$: Network bandwidth
$n$: number of existing volumes
$W_i$: Max throughput limit set for the volume specified by identifier $i$
$w_i$: Min throughput goal set for the volume specified by identifier $i$
$\sigma_i$: 1 if volume $i$ uses remote copy, 0 otherwise
$\rho_i$: Degree of throttling for the max performance limit to volume $i$

FIG. 9

STORAGE NETWORK RESOURCE MANAGEMENT

BACKGROUND

Field

The present disclosure is generally directed to storage systems, and more specifically, to systems and methods for storage network resource management.

Related Art

Generally, critical data is stored redundantly between remote locations to avoid loss to disasters such as fire, flooding, earthquakes, and terrorism. Storage devices provide a feature called "storage remote copy" that copies data between paired storage volumes to maintain data integrity in the event of a data write operation from the host computer.

In the related art, the storage devices that contain the paired storage volumes are located far enough apart so that each is not affected at the same time. This reduces the risk of simultaneous loss of both volumes. With the recent popularization of cloud services, the demand for storage services for data storage has been increasing. In the storage service of the related art, the remote copy function of storage is being used to achieve high system availability.

In general, storage service providers of the related art offer contracts based on capacity, Input/Output (IO) performance, availability, and usage period, and charge users who have signed the contract. At this time, the provider uses the Quality of Service (QoS) function of the storage to keep the lower performance limit specified in the contract or to control the upper performance limit so as not to deviate excessively to prevent profit loss.

To achieve such QoS control, the storage records the amount of data input/output processing to each volume and controls the amount of execution per unit time.

SUMMARY

In the related art, the storage remote copy transfers data across a network between storage devices. When the amount of data written per unit of time exceeds the network bandwidth, a large amount of data that cannot be transferred will accumulate, resulting in large data gaps between storage devices and potentially leading to reduced availability.

If availability is included in the storage service contract, the transfer bandwidth for remote copying should be secured according to that contract. This disclosure relates to a system that, in an environment where remote copying is performed from a storage device to another storage device over a network, and makes IO throughput QoS settings for the volume considering the bandwidth of that network. The example implementations prevent the degradation of availability in a storage system that performs remote copying by determining the sufficiency of network bandwidth based on the performance QoS setting.

Aspects of the present disclosure can involve a method, which can involve responsive to a request of a volume requiring remote copy, checking an I/O throughput setting of the volume; using network bandwidth based on the I/O throughput setting of the volume; and for the use of the network bandwidth not exceeding total remote copy network resources allocated for existing volumes configured with remote copy and the volume requiring remote copy, establishing a remote copy relationship for the volume in response to the request.

Aspects of the present disclosure can involve a computer program, which can involve instructions which can include, responsive to a request of a volume requiring remote copy, checking an I/O throughput setting of the volume; using network bandwidth based on the I/O throughput setting of the volume; and for the use of the network bandwidth not exceeding total remote copy network resources allocated for existing volumes configured with remote copy and the volume requiring remote copy, establishing a remote copy relationship for the volume in response to the request. The computer program and instructions can be stored in a non-transitory computer readable medium and executed by one or more processors.

Aspects of the present disclosure can involve a system, which can involve responsive to a request of a volume requiring remote copy, means for checking an I/O throughput setting of the volume; means for using network bandwidth based on the I/O throughput setting of the volume; and for the use of the network bandwidth not exceeding total remote copy network resources allocated for existing volumes configured with remote copy and the volume requiring remote copy, means for establishing a remote copy relationship for the volume in response to the request.

Aspects of the present disclosure can involve an apparatus, which can involve a processor, configured to, responsive to a request of a volume requiring remote copy, check an I/O throughput setting of the volume; use network bandwidth based on the I/O throughput setting of the volume; and for the use of the network bandwidth not exceeding total remote copy network resources allocated for existing volumes configured with remote copy and the volume requiring remote copy, establish a remote copy relationship for the volume in response to the request.

BRIEF DESCRIPTION OF DRAWINGS

FIG. 3 illustrates an example screen image that Storage Management Service displays to Storage Provider for Service Catalog Configuration, in accordance with an example implementation.

FIG. 5 illustrates examples of databases for managing information on storage system configurations and resources managed by the storage service, in accordance with an example implementation.

FIG. 7 illustrates the formulation of the resource checking method in step 200-1-5 in FIG. 6.

FIG. 9 illustrates an example formulation of the resource checking method in step 200-1-5 and suppression parameter calculation method in step 200-1-11 in FIG. 8.

DETAILED DESCRIPTION

Figure 1:
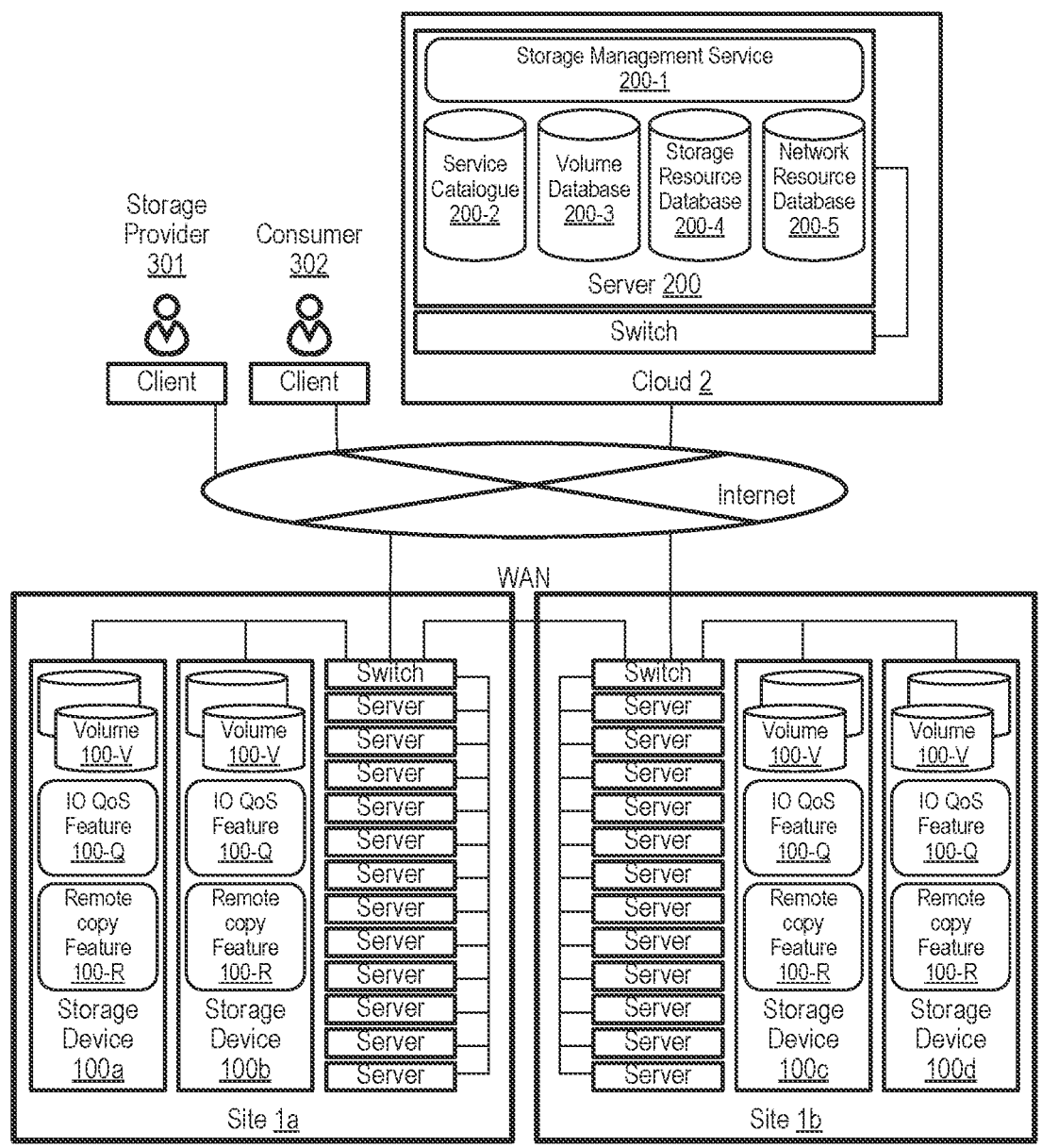
FIG. 1 illustrates the overall system structure, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates the overall system structure, in accordance with an example implementation. The system includes multiple sites 1a, 1b and Cloud 2, which are connected to each other via the Internet. Provider 302 manages the system for providing storage services, and Consumer 301 operates the storage services over the Internet.

In the example of FIG. 1, the applications for the storage services provided at sites 1a and 1b are executed in Cloud 2. The storage service application involves the storage management service 200-1 and the databases it uses: service catalog 200-2, volume database 200-3, storage resource management database 200-4, and network resource database 200-5 storage resource management database 200-4 and network resource database 200-5.

Service catalog 200-2 stores a list of services and their settings provided by the provider 301 to the Consumer 302. Volume database 200-3 stores a list of volumes provided by the system. Storage resource management database 200-4 stores resource information on performance and capacity that is provided by each storage device 100a, 100b. Network resource database 200-5 stores information on bandwidth available for data transfer in remote copy. Sites 1a and 1b are connected by a network such as a Wide Area Network (WAN).

Each site has a computer server, storage devices 100a and 100b, or, 100c and 100d, and switches, which are connected by a network such as LAN (Local Area Network) and/or SAN (Storage Area Network). The storage device may be provided by a general-purpose server running storage software rather than a dedicated device, depending on the desired implementation. Some virtual machine, container, and application run on the server and its data can be stored on the storage device 100a, 100b.

In addition, each storage device 100a, 100b can involve an IO QoS feature 100-Q for volumes and a remote copy feature 100-R for data stored on the volumes 100-V.

Figure 2:
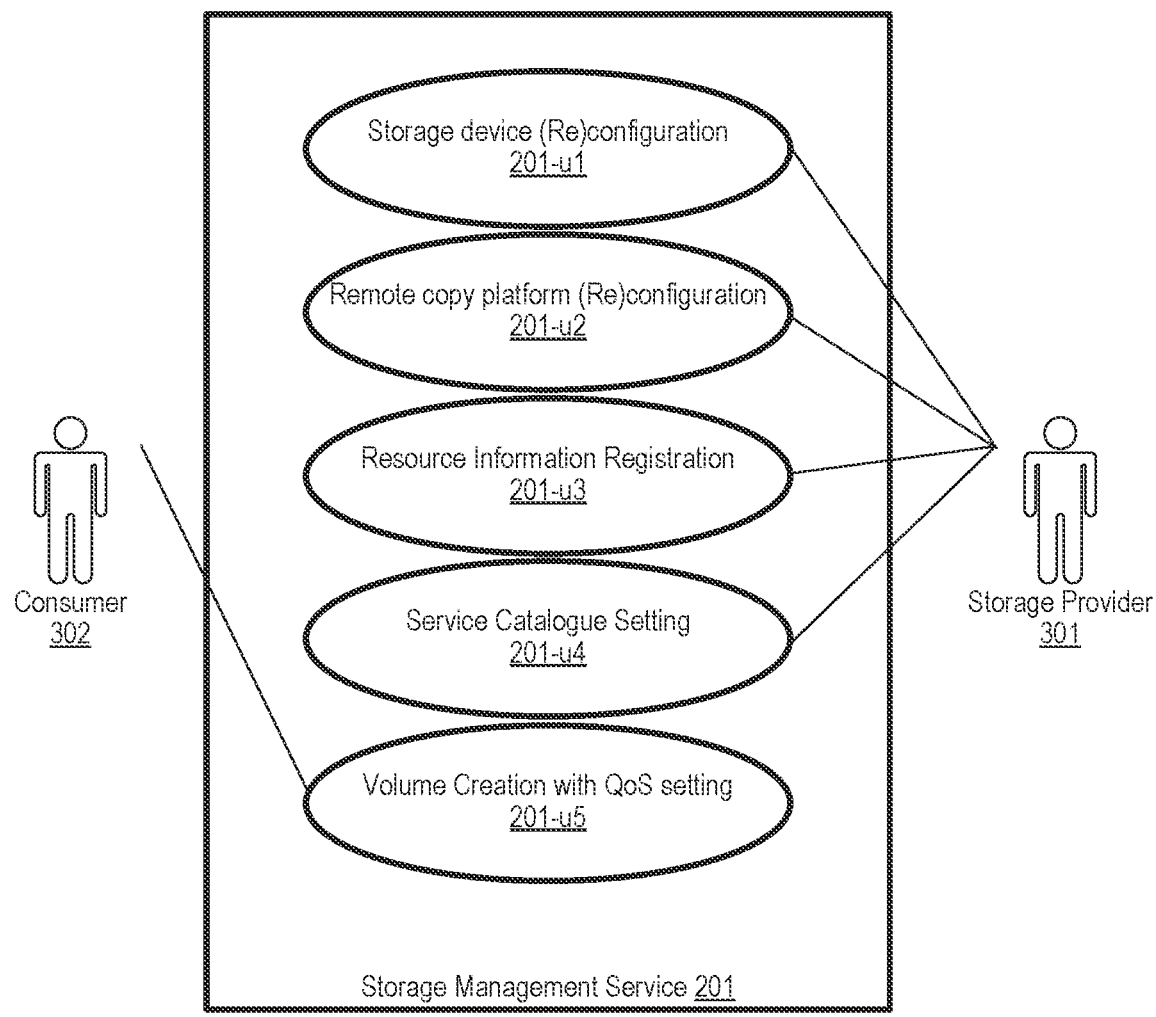
FIG. 2 illustrates an example use case diagram for Storage Management Service, in accordance with an example implementation.

FIG. 2 illustrates an example use case diagram for Storage Management Service 200-1, in accordance with an example implementation. Storage provider 301 performs Storage Device Configuration 201-u1, Remote Copy Platform Configuration 201-u2, Resource Information Registration 201-u3, and Service Catalog Setting 201-u4. Consumer 302 performs Volume Creation 201-u4.

In Storage Device Configuration 201-u1, Storage Provider 301 performs drive installation on storage devices, pool configuration, network configuration for hosts, and so on. It may be reconfigured as system requirements change.

In Remote Copy Platform Configuration 201-u2, Storage Provider 301 performs network settings between storage devices between the sites, buffer capacity (journal area) settings for data transfer, quorum settings for automatic failover, and so on. It may be reconfigured as system requirements change.

In Resource Information Registration 201-u3, Storage Provider 301 registers available capacity and IO performance for each storage and available bandwidth for remote copy for network. This operation can be done by automatic generation from the system configuration, rather than manual input by the provider. Storage Provider 301 will change parameters when there is a change in system configuration.

In Service Catalog Setting 201-u4, Storage Provider 301 registers the service name of storage volume to be provided and the corresponding capacity and performance policies.

In Volume Creation 201-u5, Consumer 302 selects, from the offered storage services, the one suitable for their use and expense and creates the volume.

FIG. 3 illustrates an example screen image that Storage Management Service 200-1 displays to Storage Provider 301 for Service Catalog Configuration 201-u4, in accordance with an example implementation. This screen displays the information stored in the Service Catalog 200-2 and accepts edits. Service Catalog 200-2 manages a list of storage volume provisioning services tied to the Service Name 200-2-1, and includes Unit Price 200-2-2, Remote Copy Application Information 200-2-3, Unit Capacity 200-2-4, Unit Maximum Write Throughput 200-2-5, Unit Minimum Write Throughput Goal 200-2-6, Unit Maximum Read Throughput 200-2-7, Unit Minimum Read Throughput Goal 200-2-8.

Service Name 200-2-1 is a unique name in the system for the service.

Remote Copy Application Information 200-2-3 indicates whether the target service uses remote copy or not.

Unit Capacity 200-2-4 is the cost that will be incurred when one unit of the service is purchased. In the example implementation of FIG. 3, it is indicated in terms of gigabytes (GB), but the present disclosure is not limited thereto.

Unit Maximum Write Throughput 200-2-5 indicates the maximum write throughput performance that can be obtained when purchasing one unit of the service.

Unit Minimum Write Throughput Goal 200-2-6 indicates the minimum write throughput performance that can be expected to be achieved when purchasing one unit of the service.

Unit Maximum Read Throughput 200-2-7 indicates the maximum write throughput performance that can be obtained when purchasing one unit of the service.

Unit Minimum Read Throughput Goal 200-2-8 indicates the minimum write throughput performance that can be expected to be achieved when purchasing one unit of the service.

Figure 4:
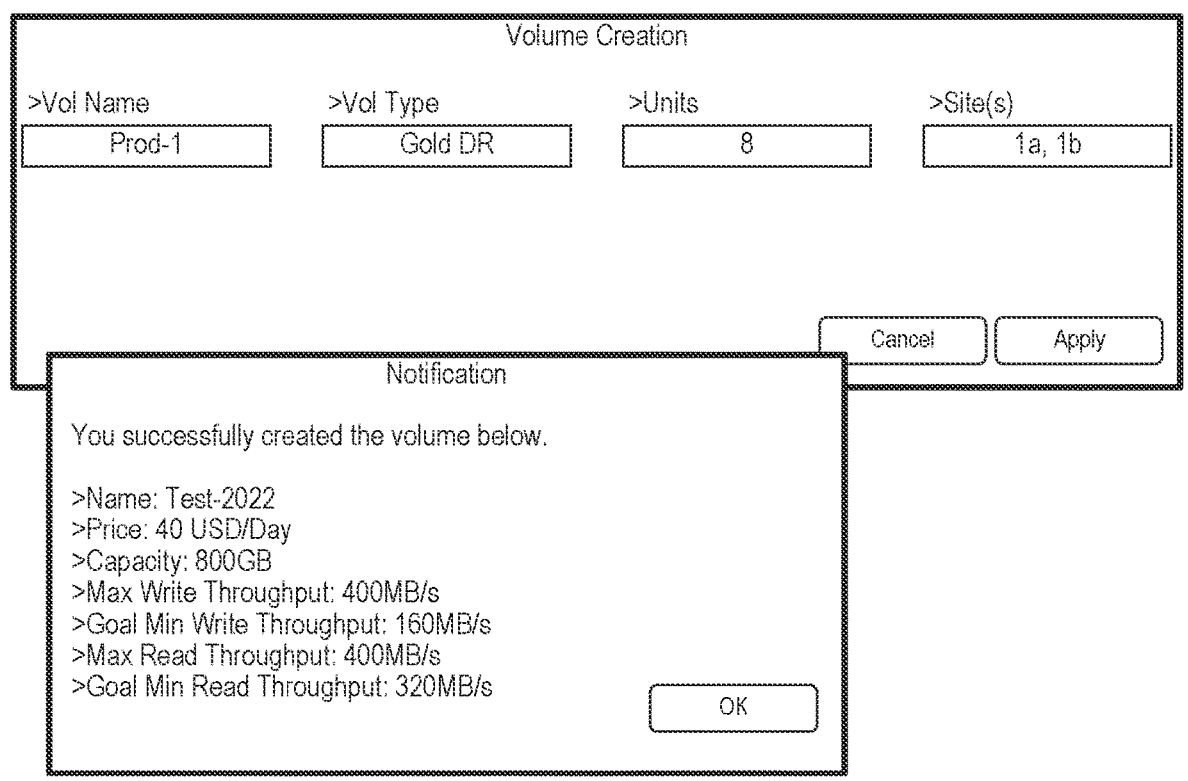
FIG. 4 illustrates an example screen image displayed by the Storage Management Service to the Consumer to ask them to enter the settings for the volume to be purchased for Volume Creation, in accordance with an example implementation.

FIG. 4 illustrates an example screen image displayed by the Storage Management Service 200-1 to the Consumer 302 to ask them to enter the settings for the volume to be purchased for Volume Creation 201-*u*4, in accordance with an example implementation. As illustrated in FIG. 4, the interface can be configured to receive a selection of a volume type from a plurality of pre-defined volume types as defined from FIG. 3, and the formed request is based on a received selection of the volume type made to the interface.

Consumer 302 names the individual volume, selects a policy from the information provided in the service catalog, and enters the number of units to be set for the target volume and the site information where the volume will be created. If the volume is successfully created, the policy set for the volume is displayed.

FIG. 5 illustrates examples of databases for managing information on storage system configurations and resources managed by the storage service, in accordance with an example implementation.

Volume Database 200-3 stores information on volumes created as a result of volume creation operations by Consumer 302. It stores the name of the volume 200-3-1, the name of the policy to be used 200-3-2, the number of units purchased 200-3-3, the name of the site where the volume was created 200-3-4, and the name of the storage device where the volume was created 200-3-5. When using the remote copy feature, information regarding two storage units and the associated site is stored.

Storage Resource Database 200-4 stores information on available storage resources for each storage device registered as a result of Resource Information Registration 201-*u*4. It stores the storage identifier (ID) of the storage device 200-4-1, available capacity 2004-2, maximum write throughput 2004-3, and maximum read throughput 200-44.

Network Resource Database 200-5 stores information on available network resources for remote copy as a result of Resource Information Registration 201-*u*4. It stores the associated sites 200-5-1, the network bandwidth of the available sites 200-5-2, and the warning threshold 200-5-3.

As illustrated in FIG. 1, it is possible that a remote copy relationship for the volume may require another storage system. In which case, the total remote copy network resources is defined as the total remote copy network resources allocated for the existing volume configured with remote copy and the volume requiring remote copy, minus bandwidth usage between a storage system managing the volume and the another storage system. For example, the bandwidth that is utilized by the existing volumes and the volume requiring remote copy between sites 1*a* and 1*b* need to be subtracted from the total remote copy network resources due to the requirement to manage the remote copy relationships between the two physical sites.

Figure 6:
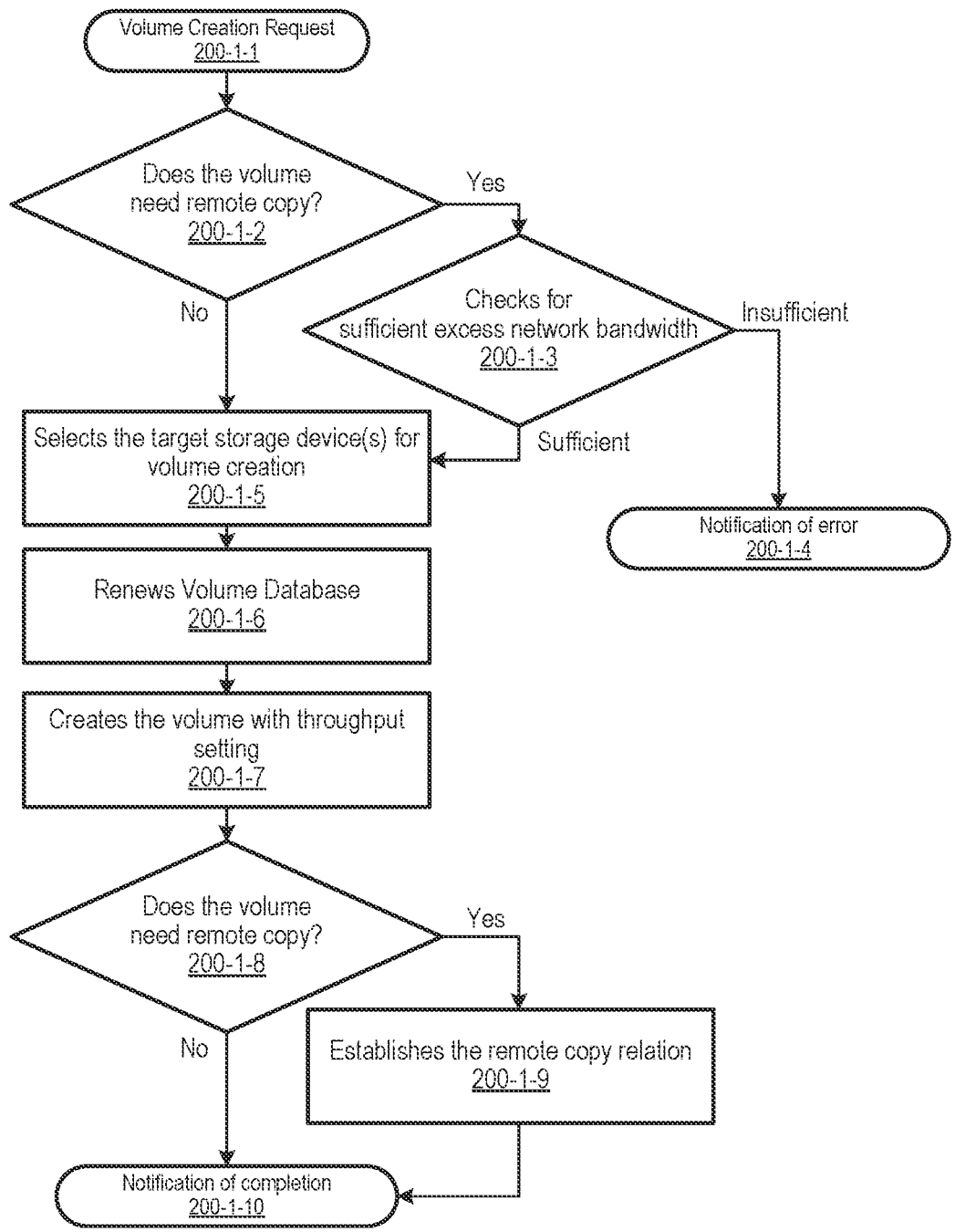
FIG. 6 illustrates the processing flow in Storage Management Service when a volume creation request is issued, in accordance with an example implementation.

FIG. 6 illustrates the processing flow in Storage Management Service 200-1 when a volume creation request is issued in 201-*u*5, in accordance with an example implementation.'

At step 200-1-1, this program is invoked upon receipt of a volume creation request. At step 200-1-2, the program checks if the policy set for the volume is to use the remote copy feature. If so (Yes), then the program proceeds to step 200-1-3, otherwise (No) the program proceeds to step 200-1-5.

At step 200-1-3, responsive to the request of the volume requiring remote copy, the program determines whether network resources are insufficient when a volume is created based on the specified settings, based on the configuration information of the existing volume stored in the volume database 200-3 and the information stored in the network resource database 200-4. To make such a determination, the program will check the IO throughput settings of the volume from referencing the configuration information of the existing volumes of FIG. 5, and use the network bandwidth based on the IO throughput settings of the volume as illustrated in FIGS. 7 and 9. If the use of the network bandwidth does not exceed the total remote copy network resources allocated for the existing volumes configured with the remote copy function and the volume requiring remote copy, then the resources are determined to be sufficient. Otherwise, the resources are determined to be insufficient.

If it is determined that the resources are insufficient, then the flow proceeds to step 200-1-4 and notifies the consumer that the volume creation failed and terminates this program. In addition, that the provider may also be notified while notifying the consumer. If the resources are sufficient, then the program proceeds to step 200-1-5. Thus, should the use of the network bandwidth exceed the total remote copy network resources allocated for the existing volumes configured with remote copy and the volume requiring remote copy, the request can thereby be rejected.

At step 200-1-5, to determine the availability of storage resources for each storage device, the program refers to the storage resource database 200-4 and the volume database 200-3. Then, the program selects a storage.

At step 200-1-6: the program registers the information of the volume in the Volume Database 200-3. At step 200-1-7, the program creates a volume with the specified capacity and QoS settings. At step 200-1-8, the program checks if the policy set for the volume is to use the remote copy feature. If so (Yes), the program proceeds to step 200-1-9, otherwise (No) the program proceeds to step 200-1-10.

At step 200-1-9, the program establishes a remote copy relation between the volumes created in the selected storage devices. At step 200-1-10, the program notifies the consumer that the volume creation completion.

FIG. 7 illustrates the formulation of the resource checking method in step 200-1-5 in FIG. 6. Specifically, FIG. 7 illustrates an example formulation F100, in which the excess network bandwidth is found by finding the summation of the maximum write throughput $W_i$ set for all existing volumes that use remote copy, and calculating the difference with the network bandwidth B that can be provided for the remote copy path. If the result is greater than the requested maximum write throughput $W_{n+1}$ of the volume being created, then the program can thereby determine that the volume can be created. In this case the total remote copy network resources is determined to be the summation of the maximum write throughput of the existing volumes configured with remote copy and the volume requiring the remote copy.

Figure 8:
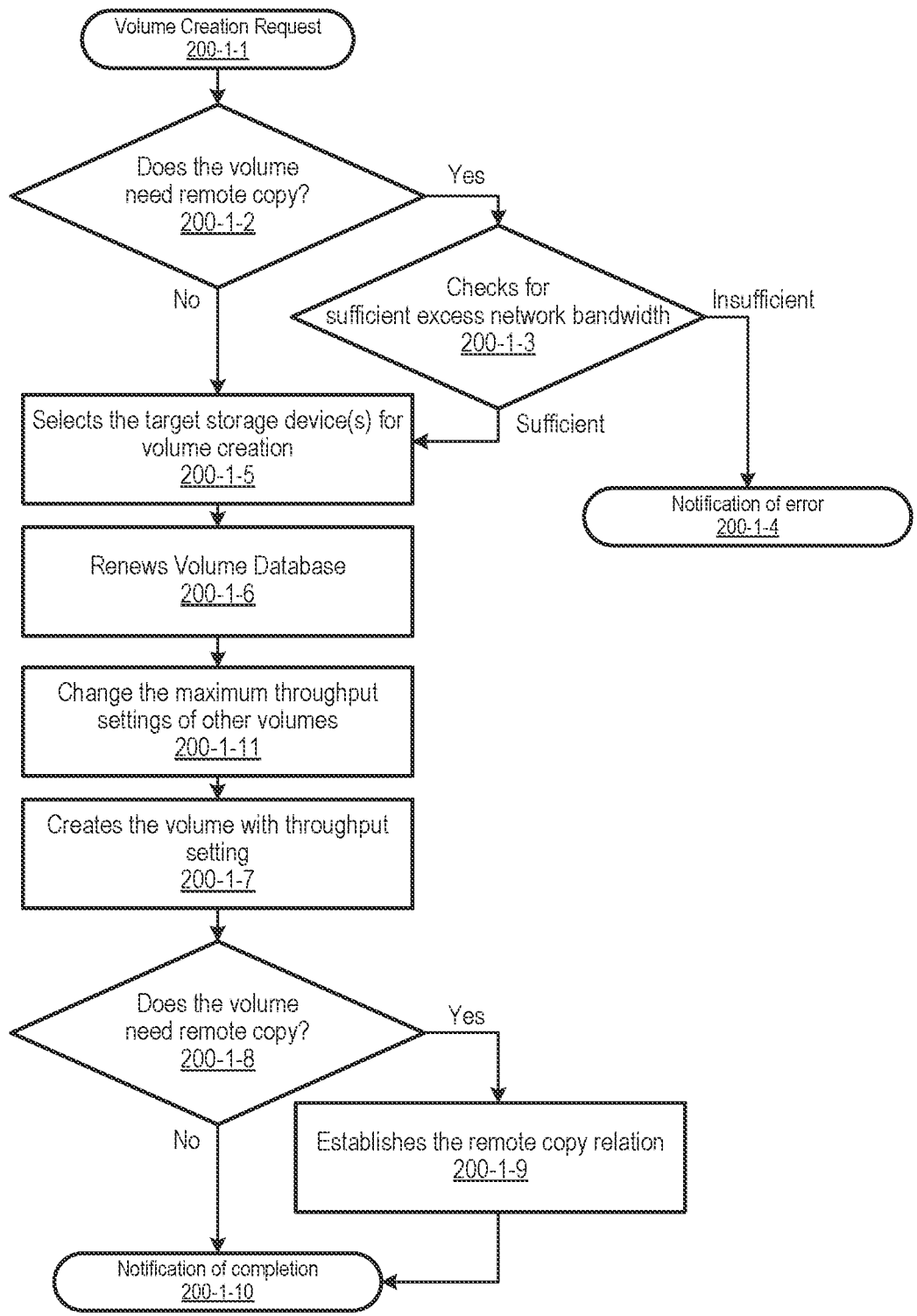
FIG. 8 illustrates another example processing flow in Storage Management Service when a volume creation request is issued, in accordance with an example implementation.

In another example implementation, FIG. 8 illustrates another processing flow in Storage Management Service 200-1 when a volume creation request is issued in 201-*u*5. The difference from FIG. 6 is that Step 200-1-11 is added between Step 200-1-5 and Step 200-1-6. At step 200-1-11, the program calculates the parameters for maximum write throughput suppression and sets them for the existing volume.

FIG. 9 illustrates an example formulation of the resource checking method in step 200-1-5 and suppression parameter calculation method in step 200-1-11 in FIG. 8. In this example, it is possible to internally setting another maximum write throughput for each of the existing volumes that is at least a minimum write throughput when it is determined that the summation of the maximum write throughput of the existing volumes exceeds the total remote copy network resources, thereby allowing the remote copy request to proceed.

Specifically, FIG. 9 illustrates an example formulation F200, in which the excess network bandwidth is found by finding the sum of the minimum write throughput goal $W_i$ set for all existing volumes that use remote copy and calculating the difference with the network bandwidth B that can be provided for the remote copy path. If the result is greater than the requested maximum write throughput $W_{n+1}$ of the volume being created, then the program can thereby determine that the volume can be created. In the formulation F201, for volumes that use remote copy, the program selects a $p_i$ such that the sum of the maximum write throughput multiplied by the suppression parameter Ri does not exceed the network bandwidth. The program sets $p_i \times W_i$ as the maximum write throughput for each volume using remote copy, thereby freeing up bandwidth for the total remote copy network resources to potentially allow a remote copy request to proceed.

Figure 10:
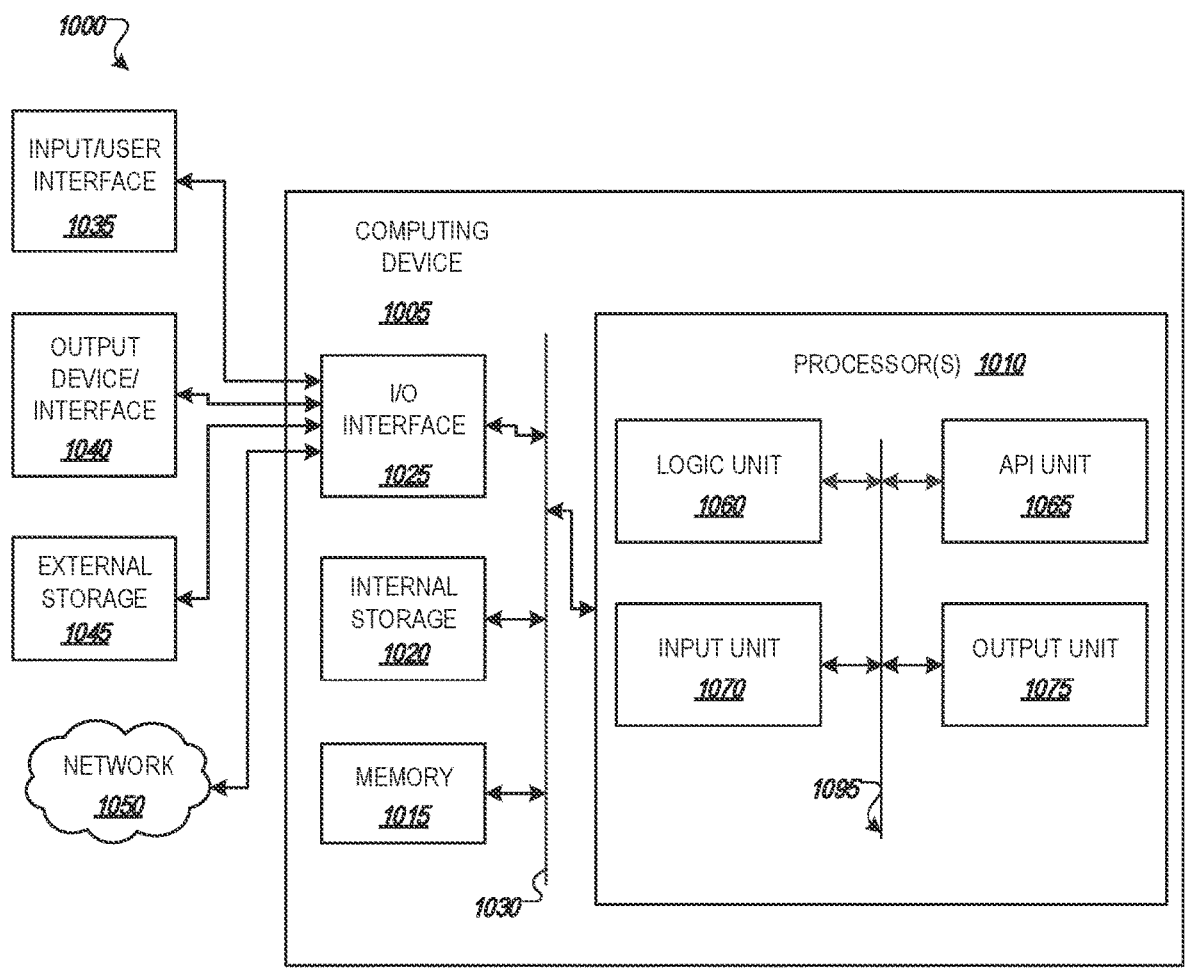
FIG. 10 illustrates an example computing environment with an example computer device suitable for use in some example implementations.

FIG. 10 illustrates an example computing environment with an example computer device suitable for use in some example implementations, such as server 200 as illustrated in FIG. 1. Computer device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide output based on the calculations described in example implementations.

Processor(s) 1010 can be configured to execute a method or computer instructions which can involve, responsive to a request of a volume requiring remote copy 200-1-3, checking an IO throughput setting of the volume; using network bandwidth based on the IO throughput setting; and for the use of the network bandwidth not exceeding total remote copy network resources allocated for existing volumes configured with remote copy and the volume requiring remote copy, establishing a remote copy relationship for the volume in response to the request as shown at 200-1-5 to 200-1-10 of FIG. 6 and FIG. 8.

Processor(s) 1010 can be configured to execute the method or computer instructions as described above, wherein the total remote copy network resources allocated for the existing volumes configured with remote copy and the volume requiring remote copy is based on a summation of a maximum write throughput of the existing volumes configured with remote copy and the volume requiring remote copy as described, for example, with respect to FIG. 7.

Processor(s) 1010 can be configured to execute the method or computer instructions as described above, and further involve, for the summation of the maximum write throughput of the existing volumes exceeding the total remote copy network resources, internally setting another maximum write throughput for each of the existing volumes that is at least a minimum write throughput as illustrated in F200 and F201 of FIG. 9.

Processor(s) 1010 can be configured to execute the method or computer instructions as described above, and further involve, for the use of the network bandwidth exceeding the total remote copy network resources allocated for the existing volumes configured with remote copy and the volume requiring remote copy, rejecting the request as illustrated in 200-1-4 of FIG. 6 and FIG. 8.

Processor(s) 1010 can be configured to execute the method or computer instructions as described above, wherein, for the remote copy relationship for the volume requiring another storage system, the total remote copy network resources is defined as the total remote copy network resources allocated for the existing volume configured with remote copy and the volume requiring remote copy, minus bandwidth usage between a storage system managing the volume and the another storage system as illustrated in FIG. 5.

Processor(s) 1010 can be configured to execute the method or computer instructions as described above, and further involve providing an interface configured to receive a selection of a volume type from a plurality of pre-defined volume types, wherein the request is based on a received selection of the volume type made to the interface as illustrated in FIGS. 3 to 5.

Figure 11A:
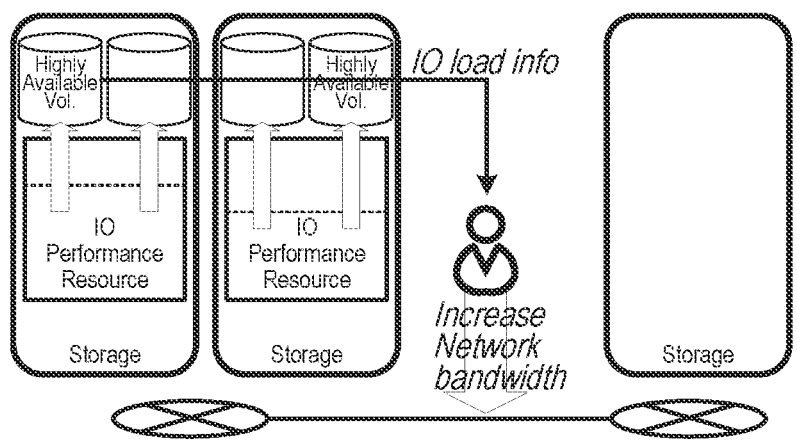
FIGS. 11A and 11B illustrate an example comparison of the related art versus the example implementations described herein.
Figure 11B:
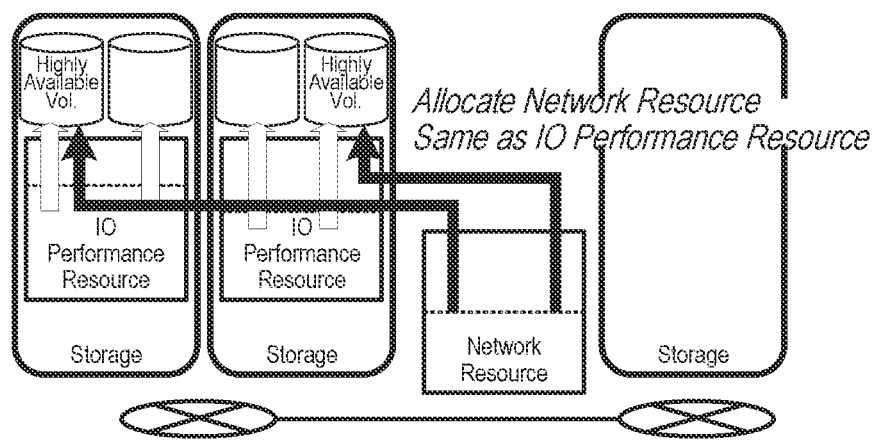

FIGS. 11A and 11B illustrate an example comparison of the related art versus the example implementations described herein. In the related art as illustrated in FIG. 11A, the storage administrator has to build the network in a manner such that the bandwidth is not exhausted, while considering the amount of IO to the volume. However, there are some challenges regarding such a configuration. For example, the volume creation operation does not allow users to be aware of the disaster recovery configuration. Thus, even when disaster recovery functions are applied, users simply select capacity, performance, and availability/reliability levels in the same way as for normal volumes, which can exceed transfer bandwidth and prevent availability degradation. Further, the related art implementation can cause violations of contracted availability levels due to remote copy network occupancy by noisy neighbors.

FIG. 11B illustrates the use of the network resource allocation and techniques in accordance with the example implementations described herein. In a similar manner, the network is built so that the bandwidth is not exhausted, while considering the amount of 10 to the volume. Further, the reserved network bandwidth is managed as a resource. In example implementations, when creating a high-availability volume, the network resources are also allocated according to the write IO limit, wherein such resources are returned when the volume is deleted. In the example implementations, the allocation is sold out when network resources are exhausted, so that no more resources will be allocated. Through the example implementations described herein, in an environment that uses remote copy, it can be possible to thereby prevent availability degradation due to excessive network usage. The example implementations described herein can also manage and allocate the write performance limit so as not to exceed the transfer bandwidth.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
responsive to a request of a volume requiring remote copy:
checking an IO throughput setting of the volume;
determining a network bandwidth based on the IO throughput setting of the volume;
in response to the network bandwidth being equal to or less than total remote copy network resources allocated for existing volumes configured with remote copy and the volume requiring remote copy, establishing a remote copy relationship for the volume in response to the request;
in response to the network bandwidth exceeding the total remote copy network resources allocated for the existing volumes configured with remote copy and the volume requiring remote copy, rejecting the request, wherein the total remote copy network resources is based on a summation of a maximum write throughput of the existing volumes configured with remote copy and the volume requiring remote copy; and
in response to the summation exceeding the total remote copy network resources, internally setting another maximum write throughput for each of the existing volumes that is at least a minimum write throughput.

2. The method of claim 1, wherein, in response to another storage system being determined as required based on the remote copy relationship, defining the total remote copy network resources as the total remote copy network resources allocated for the existing volume configured with remote copy and the volume requiring remote copy, minus bandwidth usage between a storage system managing the volume and the another storage system.

3. The method of claim 1, further comprising providing an interface configured to receive a selection of a volume type from a plurality of pre-defined volume types, wherein the request is based on a received selection of the volume type made to the interface.

4. A non-transitory computer readable medium, storing instructions for executing a process, the instructions comprising:
responsive to a request of a volume requiring remote copy:
checking an IO throughput setting of the volume;
determining a network bandwidth based on the IO throughput setting of the volume;
in response to the network bandwidth being equal to or less than total remote copy network resources allocated for existing volumes configured with remote copy and the volume requiring remote copy, establishing a remote copy relationship for the volume in response to the request;
in response to the network bandwidth exceeding the total remote copy network resources allocated for the existing volumes configured with remote copy and the volume requiring remote copy, rejecting the request, wherein the total remote copy network resources is based on a summation of a maximum write throughput of the existing volumes configured with remote copy and the volume requiring remote copy; and
in response to the summation exceeding the total remote copy network resources, internally setting another maximum write throughput for each of the existing volumes that is at least a minimum write throughput.

5. The non-transitory computer readable medium of claim 4, wherein, in response to another storage system being determined as required based on the remote copy relationship, defining the total remote copy network resources as the total remote copy network resources allocated for the existing volume configured with remote copy and the volume requiring remote copy, minus bandwidth usage between a storage system managing the volume and the another storage system.

6. The non-transitory computer readable medium of claim 4, the instructions further comprising providing an interface configured to receive a selection of a volume type from a plurality of pre-defined volume types, wherein the request is based on a received selection of the volume type made to the interface.

7. An apparatus, comprising:
a processor, configured to:
responsive to a request of a volume requiring remote copy:
check an IO throughput setting of the volume;
determine a network bandwidth based on the IO throughput setting of the volume;
in response to the network bandwidth being equal to or less than total remote copy network resources allocated for existing volumes configured with remote copy and the volume requiring remote copy, establish a remote copy relationship for the volume in response to the request;
in response to the network bandwidth exceeding the total remote copy network resources requiring remote copy, reject the request, wherein the total remote copy network resources is based on a summation of a maximum write throughput of the existing volumes configured with remote copy and the volume requiring remote copy; and
in response to the summation exceeding the total remote copy network resources, internally setting another maximum write throughput for each of the existing volumes that is at least a minimum write throughput.

8. The apparatus of claim 7, wherein, in response to another storage system being determined as required based on the remote copy relationship, defining the total remote copy network resources as the total remote copy network resources allocated for the existing volume configured with remote copy and the volume requiring remote copy, minus bandwidth usage between a storage system managing the volume and the another storage system.

9. The apparatus of claim 7, the processor further configured to provide an interface configured to receive a selection of a volume type from a plurality of pre-defined volume types, wherein the request is based on a received selection of the volume type made to the interface.

* * * * *